(12) United States Patent
Altman

(10) Patent No.: US 8,164,469 B2
(45) Date of Patent: Apr. 24, 2012

(54) SYSTEM AND METHOD FOR CONTROLLING BATTERY COOL-DOWN

(75) Inventor: Roger Altman, Alexandria Bay, NY (US)

(73) Assignee: Canadus Power Systems, LLC, Warrensville Heights, OH (US)

( * ) Notice: Subject to any disclaimer, the term of this patent is extended or adjusted under 35 U.S.C. 154(b) by 264 days.

(21) Appl. No.: 12/173,496

(22) Filed: Jul. 15, 2008

(65) Prior Publication Data

US 2010/0013648 A1 Jan. 21, 2010

(51) Int. Cl.
*G08B 21/00* (2006.01)
*H02J 7/04* (2006.01)
*H02J 7/00* (2006.01)
*G06Q 40/00* (2012.01)
*H05B 1/00* (2006.01)

(52) U.S. Cl. ............. 340/636.2; 320/148; 320/125; 705/40; 219/521

(58) Field of Classification Search ........... 340/636.2; 320/148

See application file for complete search history.

(56) References Cited

U.S. PATENT DOCUMENTS

| | | | | |
|---|---|---|---|---|
| 3,979,657 A * | 9/1976 | Yorksie | ........ | 320/136 |
| 4,583,035 A * | 4/1986 | Sloan | ........ | 320/146 |
| 5,345,163 A * | 9/1994 | Gibbons et al. | ........ | 320/163 |
| 5,519,383 A * | 5/1996 | De La Rosa | ........ | 340/636.15 |
| 7,205,746 B2 * | 4/2007 | Batson | ........ | 320/107 |
| 7,375,491 B2 * | 5/2008 | Lin | ........ | 320/107 |
| 2003/0015993 A1 * | 1/2003 | Misra et al. | ........ | 320/125 |
| 2005/0134224 A1 * | 6/2005 | Chuang | ........ | 320/132 |
| 2006/0191901 A1 * | 8/2006 | Taylor et al. | ........ | 219/521 |
| 2008/0231238 A1 * | 9/2008 | Wong et al. | ........ | 320/161 |

FOREIGN PATENT DOCUMENTS

GB 2378901 A * 2/2003

* cited by examiner

*Primary Examiner* — George Bugg
*Assistant Examiner* — Jack Wang
(74) *Attorney, Agent, or Firm* — Thompson Hine LLP

(57) ABSTRACT

A method for cooling a battery after a charging phase including the steps of providing a user display, identifying a starting point at which the charging phase of the battery transitions to a cooling phase, when the starting point is identified, instructing the user display to provide a first indication for a first predetermined amount of time, and after the first predetermined amount of time has elapsed, instructing the user display to provide a second indication.

17 Claims, 4 Drawing Sheets

SYSTEM AND METHOD FOR CONTROLLING BATTERY COOL-DOWN

BACKGROUND

The present patent application relates to post-charge battery cool-down and, more particularly, to systems and methods for monitoring and controlling post-charge battery cool-down.

Batteries often are used to supply power to lift trucks that operate in a warehouse setting. A single lift truck may cycle through three different batteries in a 24 hour period. While a first one of the three batteries is connected to the lift truck (the working phase), a second one of the three batteries may be connected to a charger (the charging phase), while a third one of the three batteries may be in a post-charge battery cool-down phase (the cool-down phase). The batteries may rotate from one phase to another every 8 hours.

Accordingly, a warehouse using battery powered lift trucks may have a battery room for storing the charging and cooling batteries and to provide a location for swapping exhausted working batteries with charged and cooled batteries. Such a battery room is illustrated in FIG. 1 and may include an array of charger/batteries units 10a, 10b, 10c, 10d. Each charger/batteries unit 10a, 10b, 10c, 10d may include an associated charger 12, a charging battery 14, a charged battery 16 and a working battery 18.

The charging battery 14 may be connected to the charger 12 by a charging cable 22. The charging cable 22 may supply the charging battery 14 with an appropriate current to raise the potential of the charging battery 14 to the desired level. The charged battery 16 may be physically connected to the charger 12 by a charging cable 24, but the electrical connection between the charged battery 16 and the charger 12 may be disrupted such that additional current is not transferred to the charged battery 16 after the desired amount of charge has been achieved. The working battery 18 may be physically disconnected from the charger 12 and mounted on a lift truck or other appropriate battery application, as shown by the disconnected charging cable 20.

Accordingly, a user seeking a new battery may enter the battery room and may select a charged battery 16 from the array 10 and may connect the discharged battery to the charger 12 to be recharged.

However, in such battery rooms, the practice of randomly selecting a charged battery 16 from the array 10 to replace a discharged battery substantially negatively impacts the life of the batteries in the array 10. In particular, it is known that maximizing post-charge battery cool-down is critical to extending battery life and performance. Therefore, by randomly selecting a charged battery 16 from the array 10, the user may not necessarily be selecting the charged battery 16 that has experienced the maximum post-charge battery cool down. Therefore, by randomly selecting charged batteries 16 from the array 10, the user may be selecting a charged battery 16 that has not cooled for the longest cooling period and, therefore, may reduce the battery life and performance of the selected battery. Indeed, over time, the process of randomly selecting batteries from the array 10 may substantially decrease the battery life and performance of all the batteries within the array 10.

Accordingly, there is a need for a system and method for distinguishing between charged batteries that are ready for use and charged batteries that require additional cool-down time.

SUMMARY

In one aspect, the disclosed method for cooling a battery after a charging phase may include the steps of providing a user display, identifying a starting point at which the charging phase of the battery transitions to a cooling phase, when the starting point is identified, instructing the user display to provide a first indication for a first predetermined amount of time, and after the first predetermined amount of time has elapsed, instructing the user display to provide a second indication.

In another aspect, the disclosed method for identifying a battery or batteries with the most cool-down time after a charging phase may include the steps of providing a user display including at least a first light, a second light and a third light, identifying a starting point at which the charging phase of the battery transitions to a cooling phase, when the starting point is identified, instructing the user display to illuminate the first light for a first predetermined amount of time, after the first predetermined amount of time has elapsed, instructing the user display to illuminate the second light for a second predetermined amount of time, and after the second predetermined amount of time has elapsed, instructing the user display to illuminate the third light.

Other aspects of the disclosed system and method for controlling battery cool-down will become apparent from the following description, the accompanying drawings and the appended claims.

DETAILED DESCRIPTION

Figure 1:
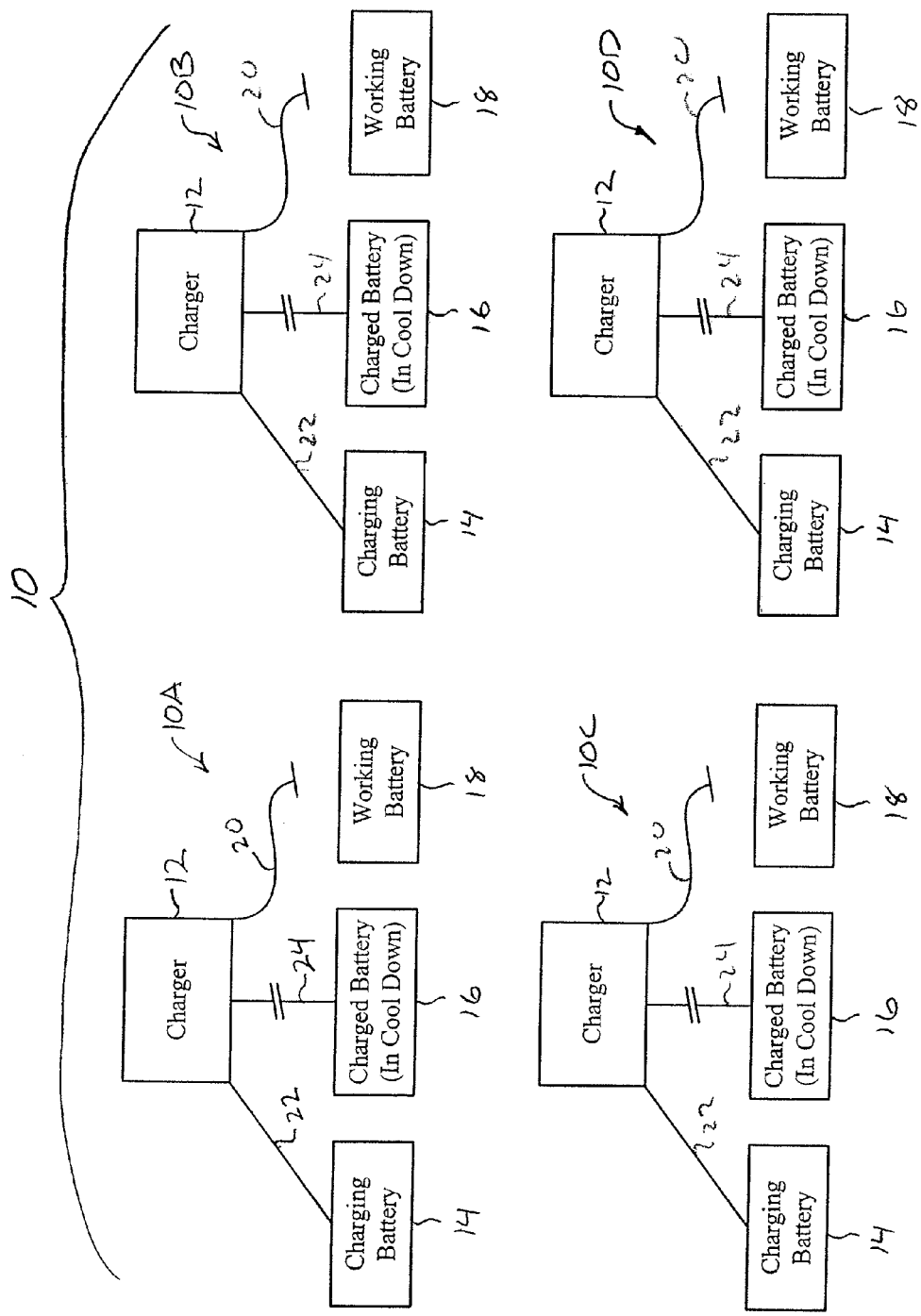
FIG. 1 is a schematic illustration of a prior art battery room.
Figure 2:
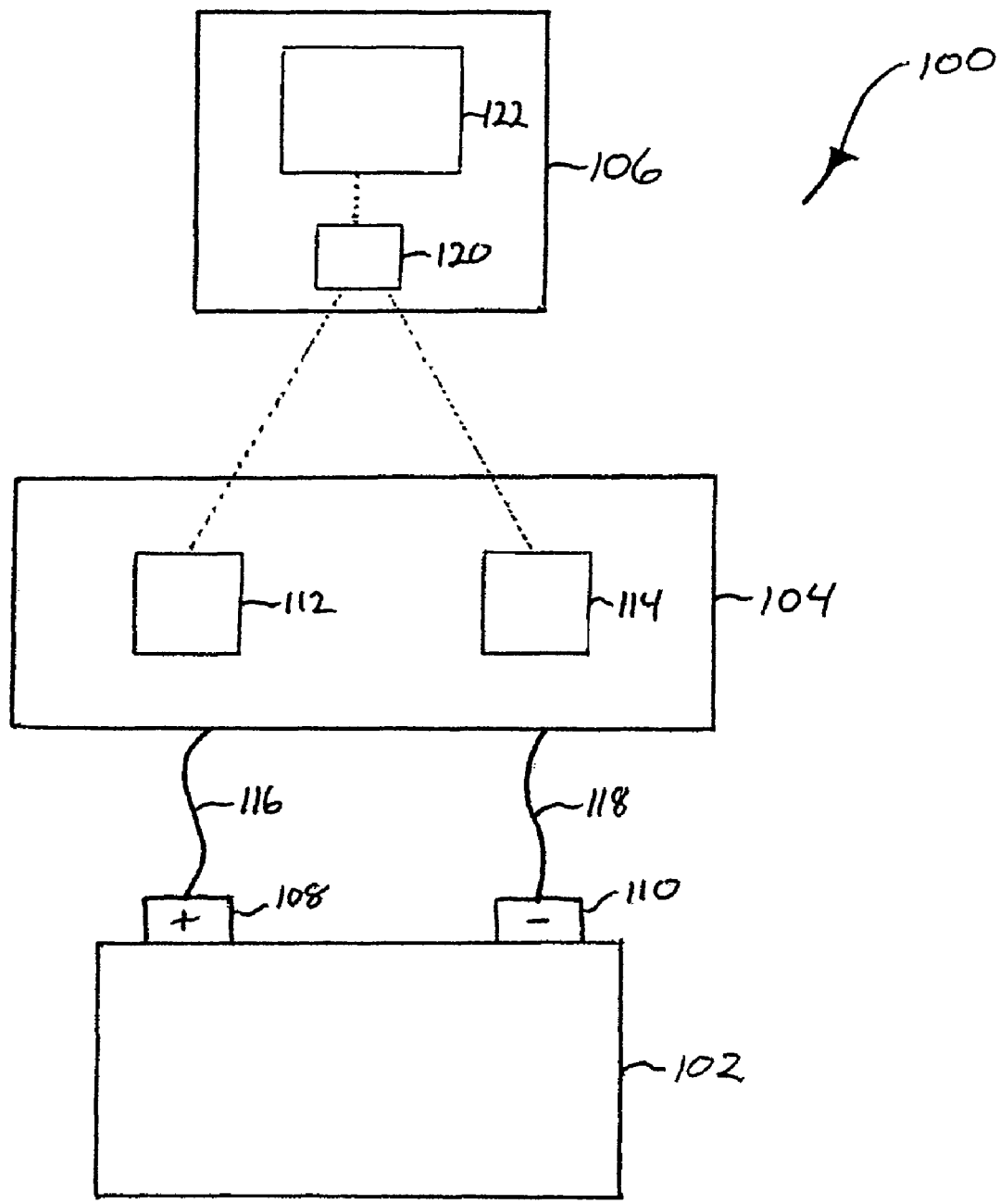
FIG. 2 is a schematic illustration of one aspect of the disclosed system for controlling battery cool-down.

Referring to FIG. 2, one aspect of the disclosed system for controlling battery cool-down, generally designated 100, may include a battery 102, a charging unit 104 and a control unit 106.

The battery 102 may be any rechargeable battery and may include a positive terminal 108 and a negative terminal 110. For example, the battery 102 may be a lead-acid battery, such as a flooded lead-acid battery, such as a flooded lead-acid battery used in motive power applications.

The charging unit 104 may include charger electronics 112, a sensor 114 and charging cables 116, 118. The charger electronics 112 may facilitate the transfer of charging current from the charging unit 104 to the battery 102 through the charging cables 116, 118. The sensor 114 may be any sensor (e.g., a potentiometer) capable of measuring the charging voltage when the charging unit 104 is connected to a battery 102. Charging cable 116 may be a positive charging cable and charging cable 118 may be a negative charging cable. While charging cables 116, 118 are shown as being separate cables, those skilled in the art will appreciate that the charging cables 116, 118 may be formed as a single cable having a positive component and a negative component.

In the assembled configuration shown in FIG. 2, the charging unit 104 may be connected to the battery 102 by connecting charging cable 116 to the positive terminal 108 of the battery 102 and charging cable 118 to the negative terminal 110 of the battery 102. When the charger electronics 112 are actuated, charging cable 116 may apply a positive potential to the positive terminal 108 of the battery 102 and charging cable 118 may apply a negative potential to the negative terminal 110 of the battery 102, thereby transferring a charging current from the charging unit 104 to the battery 102 sufficient to raise the electrical potential of the battery 102 to the desired level.

At this point, those skilled in the art will appreciate that the charging unit 104 may be any device capable of supplying a charging current to the battery 102 and may include various components and features not discussed herein.

The control unit 106 may include a processor 120 and a user display 122. As shown in FIG. 2, the control unit 106 may be an independent unit. However, those skilled in the art will appreciate that the control unit 106 may be mounted on either the charging unit 104 or the battery 102, or may be integral with the charging unit 104 or the battery 102.

The processor 120 may be any device capable generating and communicating a command signal to the user display 122 to actuate the user display 122 in accordance with the present disclosure. For example, the processor 120 may be a computer processor or the like. The processor 120 may be in communication with the user display 122, as well as the charger electronics 112 and the sensor 114. Those skilled in the art will appreciate that the communication between the processor 120 and the user display 122, the charger electronics 112 and the sensor 114 may be configured as desired, and may be hard-wired, wireless or otherwise, and one-way, two-way or otherwise.

Figure 3:
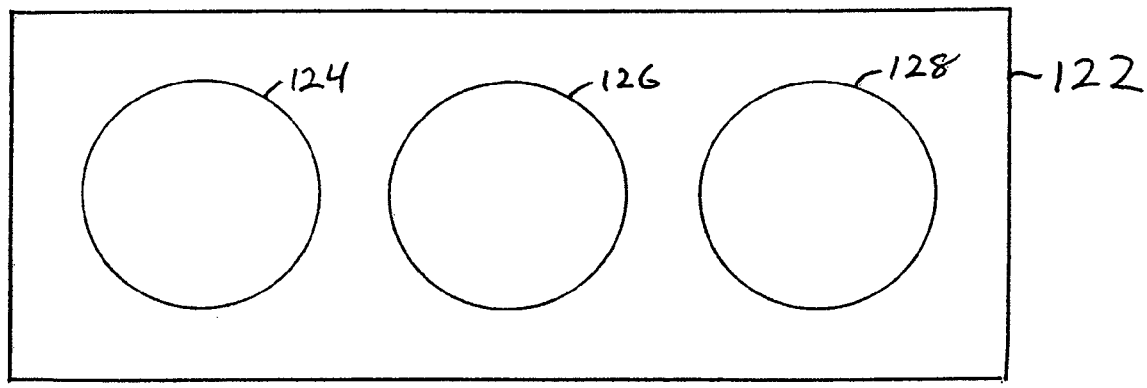
FIG. 3 is a schematic illustration of an exemplary aspect of the user display of the system of FIG. 2.

The user display 122 may be any display capable of communicating with, or signaling, a user, whether visually, audibly or otherwise, about the status of the battery 102 connected to the charging unit 104. In one aspect, the user display 122 may include one or more lights (e.g., an incandescent bulb, an LED or the like), wherein each light is indicative of a particular status of the system 100. For example, as shown in FIG. 3, the user display 122 may include a first light 124 (e.g., a red light), a second light 126 (e.g., a yellow light) and a third light 128 (e.g., a green light). In another aspect, the user display 122 may include a graphical or textual display (i.e., a display capable of presenting text or graphics to a user). For example, the user display 122 may include an image screen or monitor. At this point, those skilled in the art will appreciate that the type, as well as the number of user displays 122, is a matter of design choice, and may vary as necessary to achieve the desired result.

When a battery 102 is connected to the charging unit 104, the processor 120 may begin monitoring the charging voltage by way of signals received from the sensor 114. When the detected charging voltage is less than a predetermined reference value ("RV"), the processor 120 may actuate the charger electronics 112 to supply a charging current to the battery 102, as discussed above. Then, when the processor 120 determines that the charging voltage has reached or exceeded the reference value RV, the processor 120 may instruct the charger electronics 112 to cease supplying the battery 102 with a charging current, at which point the charging cycle may be considered complete.

Figure 4:
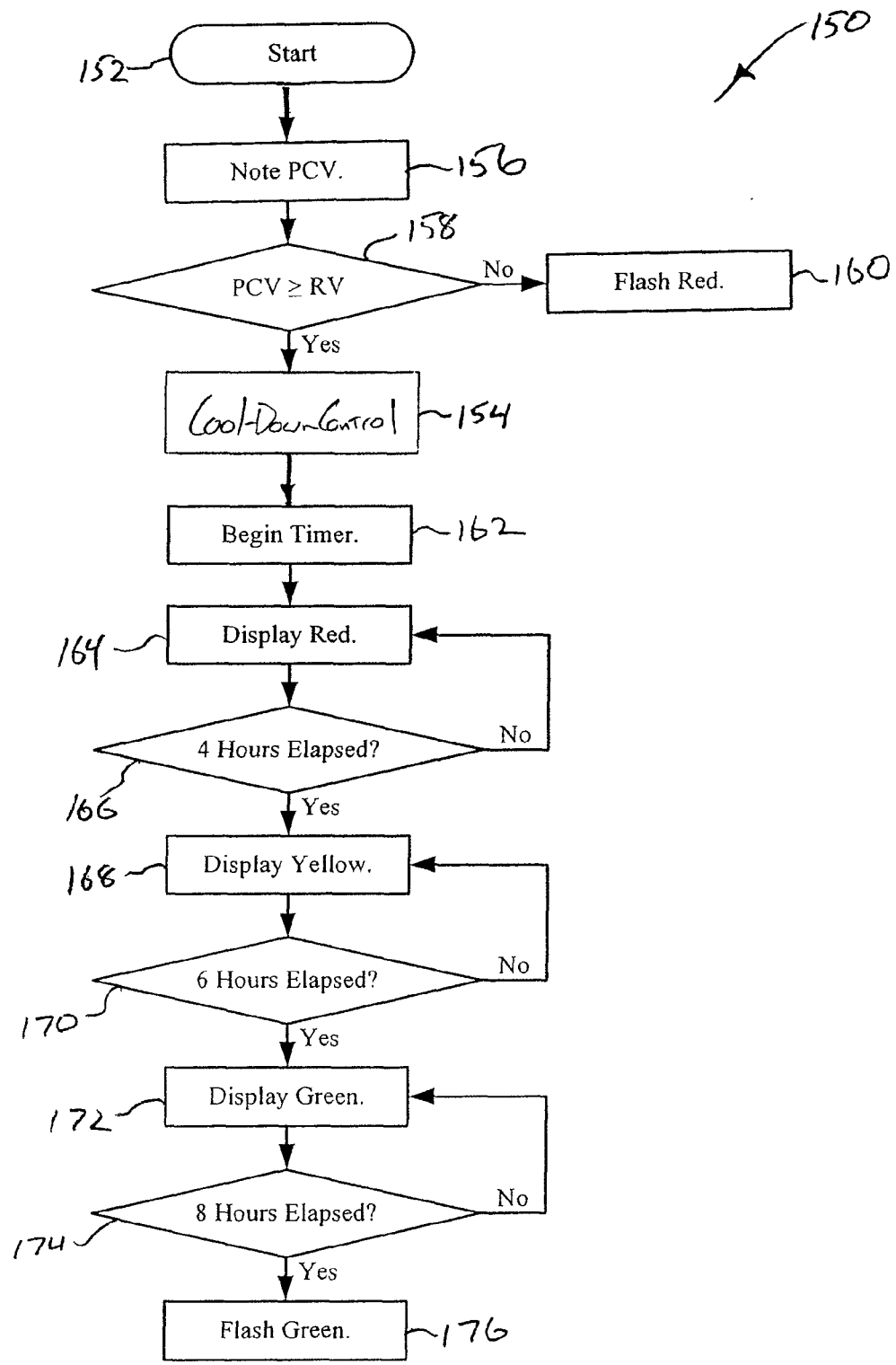
FIG. 4 is a flow chart illustrating the operation of the system of FIG. 2.

In one aspect, the system 100 may operate in accordance with the method 150 illustrated in FIG. 4. The method 150 may begin at block 152 when the charging phase is complete. The charging phase may be considered complete when the charging voltage reaches or exceeds the predetermined reference value RV, as discussed above, or at any other time the charger electronics 112 are deactivated. For example, the charging phase may be considered complete when the charger electronics 112 are deactuated by user intervention.

As shown at block 156, the processor 120 may note the charging voltage at the end of the charging phase (i.e., the peak charging voltage ("PCV")) and, as shown at block 158, the peak charging voltage PCV may be compared to the reference value RV. If the peak charging voltage PCV is determined to be at or greater than the reference value RV, then the method 150 may proceed as discussed below. However, if the peak charging voltage PCV is determined to be less than the reference value RV, indicating that charging may not be complete or that some other error or damage may have occurred during the charging phase, then the processor 120 may instruct the user display 122 to provide an appropriate indication (e.g., a signal, a visual communication or an audible communication). For example, when the user display 122 shown in FIG. 3 is used with the system 100, the processor 120 may instruct the first light 124, which may be a red light, to flash, as shown at box 160, thereby providing the user with an appropriate warning.

At block 154, the method 150 may proceed to cool-down control. Once the cool-down phase has begun (block 154), the processor 120 may begin tracking elapsed time. For example, as shown at block 162, the processor 120 may initiate a timer or like device or functionality. Furthermore, at the beginning of the cool-down phase, the processor 120 may instruct the user display 122 to provide an appropriate indication that the cool-down phase has just begun and that the battery 102 should not be used. For example, when the user display 122 shown in FIG. 3 is used with the system 100, the processor 120 may instruct the first light 124, which may be a red light, to illuminate, as shown at box 164, thereby providing the user with an appropriate warning.

As shown at block 166, after a first predetermined amount of time has elapsed (e.g., 4 hours), the processor 120 may instruct the user display 122 to provide an indication that the cool-down phase has been underway for a certain amount of time but is not yet complete (i.e., the battery 102 may be used if necessary, but has not been fully cooled). For example, when the user display 122 shown in FIG. 3 is used with the system 100, the processor 120 may deactuate the first light 124 and may instruct the second light 126, which may be a yellow light, to illuminate, as shown at box 168, thereby providing the user with an appropriate warning.

As shown at block 170, after a second predetermined amount of time has elapsed (e.g., 6 hours), the processor 120 may instruct the user display 122 to provide an indication that the cool-down phase is almost complete (i.e., the battery 102 is substantially cooled and may be used if necessary). For example, when the user display 122 shown in FIG. 3 is used with the system 100, the processor 120 may deactuate the second light 126 and may instruct the third light 128, which may be a green light, to illuminate, as shown at box 172, thereby providing the user with appropriate notice.

Finally, as shown at block 174, after a third predetermined amount of time has elapsed (e.g., 8 hours), the processor 120 may instruct the user display 122 to provide an indication that the cool-down phase is fully complete (i.e., the battery 102 is fully cooled and ready for use). For example, when the user display 122 shown in FIG. 3 is used with the system 100, the processor 120 may instruct the third light 128, which may be a green light, to flash, as shown at box 176, thereby providing the user with appropriate notice.

At this point, those skilled in the art will appreciate that the number and length of the predetermined time intervals discussed above are only exemplary. Indeed, in a first alternative aspect, a single predetermined time interval may be used (e.g., a red light during the first two hours of cool-down and then a green light thereafter). In a second alternative aspect, four or more time intervals may be used to differentiate between incremental differences in battery life versus battery cool-down time.

Accordingly, the disclosed systems and methods provide a user with a means for quickly and easily identifying which post-charge batteries are ready for use. The disclosed system and method may be particularly useful in a battery room where many batteries are constantly being charged and cooled and the cooling batteries are in various stages of cool-down.

Although various aspects of the disclosed systems and methods for controlling battery cool-down have been shown and described, modifications may occur to those skilled in the art upon reading the specification. The present patent application includes such modifications and is limited only by the scope of the claims.

What is claimed is:

1. A method for cooling a battery after a charging phase to indicate a cool-down state of said battery to a user thereof, said method comprising the steps of: providing a user display; identifying a starting point at which said a peak charging voltage of said battery, wherein said starting point is identified only if said peak charging voltage is greater than or equal to a reference value, and said charging phase of said battery transitions to a battery cool-down phase; when said starting point is identified, instructing said user display to provide a first indication, said first indication showing that said battery should not be used, said first indication lasting for a first pre-set, fixed time interval after said starting point; and after said first pre-set, fixed time interval has elapsed, instructing said user display to provide a second indication, said second indication showing that said battery has cooled down sufficiently to be used.

2. The method of claim 1 wherein said battery is a lead-acid battery.

3. The method of claim 1 wherein said user display includes a first light and a second light, wherein said first indication includes illuminating said first light and said second indication includes illuminating said second light.

4. The method of claim 3 wherein said first light is a substantially red-colored light and said second light is a substantially green-colored light.

5. The method of claim 1 wherein said first pre-set, fixed time interval is selected from time intervals lasting from about 2 to about 8 hours.

6. The method of claim 1 wherein said second indication is displayed for a second pre-set, fixed time interval.

7. The method of claim 6 wherein said second pre-set, fixed time interval is selected from time intervals lasting from about 2 to about 6 hours.

8. The method of claim 6 further comprising the step of, after said second pre-set, fixed time interval has elapsed, instructing said user display to provide a third indication, said third indication showing that said cool-down phase is fully complete.

9. The method of claim 8 wherein said user display includes a first light, a second light and a third light, wherein said first indication includes illuminating said first light, said second indication includes illuminating said second light, and said third indication includes illuminating said third light.

10. The method of claim 9 wherein said first light is a substantially red-colored light, said second light is a substantially yellow-colored light, and said third light is a substantially green-colored light.

11. The method of claim 1 further comprising the step of instructing said user display to provide an error indication if said peak charging voltage is less than said reference value.

12. The method of claim 11 wherein said error indication includes a flashing light.

13. A method for cooling a battery after a charging phase to indicate a cool-down state of a battery to a user thereof, said method comprising the steps of: providing a user display including at least a first light, a second light and a third light; identifying a starting point at which a peak charging voltage of said battery, wherein said starting point is identified only if said peak charging voltage is greater than or equal to a reference value, and said charging phase of said battery transitions to a battery cool-down phase; when said starting point is identified, instructing said user display to illuminate said first light for a first pre-set, fixed time interval after said starting point, said illuminated first light indicating that said battery has not cooled sufficiently to be used; after said first pre-set, fixed time interval has elapsed, instructing said user display to illuminate said second light for a second pre-set, fixed time interval, said illuminated second light indicating that said battery may be used if necessary but has not been fully cooled; and after said second pre-set, fixed time interval has elapsed, instructing said user display to illuminate said third light for a third pre-set, fixed time interval, said illuminated third light indicating that said cool-down phase is complete and said battery is fully cooled and ready for use.

14. The method of claim 13 wherein said first light is a substantially red-colored light, said second light is a substantially yellow-colored light, and said third light is a substantially green-colored light.

15. The method of claim 13 wherein said battery is a lead-acid battery.

16. The method of claim 13 wherein said first pre-set, fixed time interval is selected from time intervals lasting from about 2 to about 4 hours, said second pre-set, fixed time interval is selected from time intervals lasting from about 2 to about 4 hours, and said third pre-set, fixed time interval is selected from time intervals lasting from about 2 to about 4 hours.

17. The method of claim 13 further comprising the step of flashing said first light if said peak charging voltage is less than said reference value.

* * * * *